United States Patent [19]

Alden et al.

[11] Patent Number: 5,458,051
[45] Date of Patent: Oct. 17, 1995

[54] BELT COOKING APPARATUS

[75] Inventors: Lorne B. Alden, Shelburne, Vt.;
Richard H. Chapman, Camillus, N.Y.;
Greg M. Sterling, Bernville, Pa.

[73] Assignee: G.S. Blodgett Corporation, Burlington, Vt.

[21] Appl. No.: 158,581

[22] Filed: Nov. 29, 1993

[51] Int. Cl.$^6$ ............................. A47J 37/00; A47J 37/04
[52] U.S. Cl. ........................ 99/349; 99/373; 99/386; 99/423; 99/443 C; 198/626.5; 198/813; 219/388
[58] Field of Search ................. 99/349–351, 353, 99/373, 386, 423, 443 R, 443 C; 426/523; 198/813, 626.5; 219/388

[56] References Cited

U.S. PATENT DOCUMENTS

| | | | |
|---|---|---|---|
| 2,907,450 | 10/1959 | Reid | 198/813 |
| 3,065,079 | 11/1962 | Elliott | 99/349 X |
| 3,170,564 | 2/1965 | Gatto | 198/626.5 |
| 3,329,561 | 7/1967 | Rojecki et al. | 198/813 |
| 3,474,893 | 10/1969 | Morine . | |
| 3,581,652 | 6/1971 | Chauvin | 99/443 C |
| 3,646,880 | 3/1972 | Norris . | |
| 3,693,452 | 9/1972 | McGinley et al. | 99/386 |
| 3,739,712 | 6/1973 | Duning . | |
| 3,965,807 | 6/1976 | Baker . | |
| 4,072,092 | 2/1978 | Kohli et al. | 99/443 C |
| 4,197,792 | 4/1980 | Mendoza | 99/353 |
| 4,261,257 | 4/1981 | Henderson et al. | 99/423 |
| 4,567,819 | 2/1986 | Adamson . | |
| 4,667,589 | 5/1987 | Bishop . | |
| 5,044,264 | 9/1991 | Forney . | |
| 5,074,402 | 12/1991 | Bender-Zanoni et al. | 198/626.5 |
| 5,267,826 | 12/1993 | Peters | 198/626.5 |

FOREIGN PATENT DOCUMENTS 2464650  4/1981  France ................................. 99/349

*Primary Examiner*—Timothy F. Simone
*Attorney, Agent, or Firm*—Lowe, Price, LeBlanc & Becker

[57] ABSTRACT

A belt grill is described herein for continuously cooking fast food products on a conveyor formed of counter-rotating heat conductive belts. The belts are heated by platens disposed above and below whereby a run of the belts passes in heat conductive relationship between the platens, and the food to be cooked is placed in the nip between the rotating belts. The device further includes means for tensioning the belts which can be automatically released by increasing the distance between the platens whereby when the distance exceeds a predetermined maximum, all tension on both belts will be released so that the belts can be quickly removed for cleaning or replacement. The belts are preferably Teflon coated fiberglass and may be disposed at an angle to the horizontal to facilitate grease removal from the cooking process.

12 Claims, 5 Drawing Sheets

BELT COOKING APPARATUS

BACKGROUND OF THE INVENTION

1. Field of the Invention

This invention relates to specific improvements to a belt grill or belt cooking device and, in particular, to such device useful in fast food type applications wherein large quantities of food portions are cooked rapidly and uniformly.

2. Description of the Prior Art

Belt cooking devices known as belt grills have been in use for processing food products such as hamburgers and other meat patties, chicken and fish filets, pancakes, sandwiches, and other foods. Cooking is achieved by heat conduction to the food product as it is conveyed through heated platens. Typically, a belt grill uses upper and lower platens arranged in parallel planes which are heated by conventional means such as electricity, gas or the like. Opposed belts of flexible, heat resistant material convey the food between the hot platens and in contact therewith so that the uncooked food is fed onto the belt at one end and the cooked product exits the device at the other. The prior art includes both single belt devices and opposed belts. Typically, a belt may be constructed of metal such as stainless steel, links or mesh, or a more flexible material such as Teflon laminated over fiberglass fabric. A typical belt grill is described in U.S. Pat. No. 3,646,880.

In U.S. Pat. No. 5,044,264, a pair of opposed belts are used to convey food products between heated platens, and in that patent grill stripes or marks are transferred onto the food products to simulate cooking on an open grill. The belts are described therein as flexible, heat resistant, typically Teflon laminated over fiberglass fabric so that the cooked product will not tend to stick to the belts.

In U.S. Pat. No. 3,965,807, however, a single conveyor is used with an open design wherein pushers are provided for patties. Patties are then pushed over a lower platen in contact therewith and under an upper platen also in contact for heat by conduction. Obviously, direct contact between the platen and the food to be cooked will require cleaning the platen itself and, presumably, a cool down period to achieve the cleaning periodically. In addition, by using a bar-type open conveyor belt, the food to be cooked must be firm or it will tend to break up. The pressure applied by the platens onto the food also is critical to maintain conductive contact as the food cooks and shrinks. Therefore, this type of apparatus requires more or less skilled operation and maintenance.

Similarly, in U.S. Pat. No. 3,739,711, an open mesh or bar-type single conveyor is used and direct contact is maintained between the platens and the food to be cooked. This device, however, disposes the platens at an angle to the horizontal to facilitate grease removal but it requires that the food to be cooked becomes partially imbedded in the open mesh of the conveyor belt. This also will require cleaning the platens and the mesh belt to remove baked on food particles and the like.

In U.S. Pat. No. 4,567,819, there is described a conveyor-type grill apparatus using upper and lower cooking platens and an endless conveyor wherein the patties are conveyed between the platens into the device, and then returned to be discharged at the front or inlet side of the device. In this way, the size of the unit is diminished but continuous operation becomes difficult. The upper and lower platens also are intended to directly contact the hamburger patties to be cooked but are coated with Teflon to inhibit sticking. This conveyor, however, does dispose the platens at an angle to the horizontal whereby grease removal will be facilitated.

In U.S. Pat. No. 4,667,589 a conveyor grill is described wherein patties are initially cooked on an underside as they pass on an upper conveyor and are then flipped onto a lower conveyor wherein they are cooked on the opposite side. An open mesh conveyor belt is provided and on the second flight of the conveyor, the patties are sandwiched between belts to flatten them. This device does require two flights and, therefore, is a complicated mechanism.

In all such conveyor-type belt grills it is necessary to engage the food product with pressure either between the belts or between the hot platens or both while being cooked so that cooking occurs by conduction. When the cooking surface is the hot platens, however, the lack of flexibility renders the spacing complicated as the food product shrinks.

When the grill is formed with two opposed belts as in U.S. Pat. No. 5,044,264, the food product may be slightly compressed between the upper and lower belts which are flexible as it advances. The belts then can form a nip to receive the food if they are flexible to maintain the desired pressure even though the heated platens above and below the belts are maintained in parallel relationship to each other. When the belts are constructed of a material such as Teflon and they maintain contact with the platen, heat generated by the platens is conducted through the belts and into the item being cooked without the item making direct contact with the platen and while keeping the platens disposed in a parallel relationship to each other. Prior art devices which utilize opposed belts of Teflon rather than open mesh metal have experienced difficulty in adjusting the pressure to be maintained on the food product or in adjusting for different thicknesses of food product to be cooked. In addition, the belts being of a solid material, grease removal in a fast food type operation is a problem. In the less flexible metal-type belts, the grease automatically drains as it accumulates. In the Teflon-coated or other type solid belts, grease can accumulate on the belt itself unless a drainage is provided.

Accordingly, while the use of opposed, flexible heat conductive belts to convey food to be cooked through the cooking area offers distinct advantages to a single mesh-type belt in such a device, it is still necessary to provide for the grease generated in the cooking process and to clean the belts.

In order to maintain Teflon-coated fabric belts at maximum efficiency, tensioners need to be provided in addition to guides which provide a desired nip. Furthermore, in order to minimize downtime for cleaning and other maintenance in which the belts must be removed, it would be desirable to have tensioners which can be readily released. U.S. Pat. No. 3,474,893 describes a conventional single continuous belt conveyor with spring-loaded tensioners provided on rollers which extend downwardly at substantially a 90° angle to the horizontal conveyor flight. The rollers are intended to be adjustably mounted at opposite longitudinal ends and positioned so that the conveyor extends longitudinally over a conveyor table and completely encircles the table with the tensioners applying force to the lower stretch or flight of the conveyor. In this conveyor rotating to a horizontal position releases a belt for quick removal from the conveyor frame. There is no disclosure herein, however, for application of this technology to belt grills.

Accordingly, there is a need for a belt grill wherein the belt spacing may be adjusted readily and wherein downtime for cleaning may be minimized by providing for rapid release and replacement of the individual belts. It is further desired to have automatic and self-adjusting belt tensioning and automatic positioning and repositioning of the platen clearance space. Existing belt grills used in food processing operations which utilize the typical configuration described in the above-identified patents require considerable mechanical disassembly to replace or exchange belts. Additionally, belt-tensioning devices are complex and difficult to adjust. Although food processing operations permit setup time to position the platen clearance, the food service industry application of this type of device cannot tolerate the setup time required when changing food types with existing devices. Similarly, restrictive time requirements for cleaning as well as constraints imposed by available space and consideration for existing methods of grease disposal that exist in the fast food industry may differ significantly from those encountered in food processing operations.

SUMMARY OF THE INVENTION

It has been discovered, however, that a belt-cooking grill apparatus can be provided which is suitable for the fast food industry and which utilizes a unique, automatic belt-tensioning method whereby both upper and lower belts' tension adjustments are made simultaneously. In addition, rapid belt removal and critical top heated platen clearance spacing relative to the bottom heated platen is provided.

In addition, the device of this invention provides grease containment or collection from a central removal point and scraper or doctor blades are provided at specific locations to remove grease from the belts.

The device of this invention then utilizes opposed belts which are preferably fiberglass coated with Teflon and, therefore, of flexible material inherently resistant to the accumulation of cooked food products. The belts are disposed between upper and lower heated platens and are intended to receive uncooked food products such as hamburger patties or the like between the nip at an entrance end and to expel cooked food products at the opposite end. In one embodiment of this invention the belts are sloped at a slight angle to the horizontal to assist in grease accumulation and doctor blades are provided which may be angled to the path of travel of the conveyor belts and which are disposed adjacent the belt rollers to assist in cleaning. Most importantly, however, the belts are mounted on rollers which, in turn, are cantilevered to a support structure. Tensioners are provided at either end of the belt rollers which are automatically releasable. The upper platen is movable relative to the lower platen and the upper belt is mounted on the support structure for the upper platen. Therefore, the entire support structure is movable relative to the lower platen and its belt to position the belts and respective platens at a desired separation for cooking food of a specific thickness. Cleaning is facilitated, however, by movement of the cantilevered support structure to raise the upper platen and belt, whereby the tensioners can be released and the belts quickly removed to be cleaned or replaced.

Accordingly, it is an object of this invention to provide a belt grill type cooker which is suitable for fast food industry utilization wherein opposed Teflon-coated fabric belts are utilized, each belt being heated by a separate platen whereby the food products are introduced into the cooker into the nip between belts at one end and cooked food products extracted from the opposite end.

It is another object of this invention in a belt grill for use in the fast food industry to provide a grill with opposed rotating belts for conveying the food to be cooked through a cooking area and in which belts are maintained at a predetermined tension by automatically releasable tensioners whereby the belts can be quickly removed for cleaning and replacement by releasing the tensioners.

It is a further object of this invention to provide a belt cooking grill wherein heat is supplied to heat conductive opposed belts by opposed platens, one disposed above and another below the opposed belts, wherein the upper belt and platen are movable vertically relative to the lower belt and platen whereby the spacing between the two may be readily adjusted.

It is still another object of this device to provide a belt cooking grill wherein food products to be cooked are conveyed in the nip between opposed rotating belts through a cooking area formed by upper and lower platens which heat the food by conduction through the belts wherein the rotating belts are constantly scraped at rollers supporting the same by doctor blades disposed to remove grease therefrom for collection at a common collection point.

These and other objects will become readily apparent with reference to the drawings and following description wherein:

DETAILED DESCRIPTION OF THE INVENTION

Figure 1:
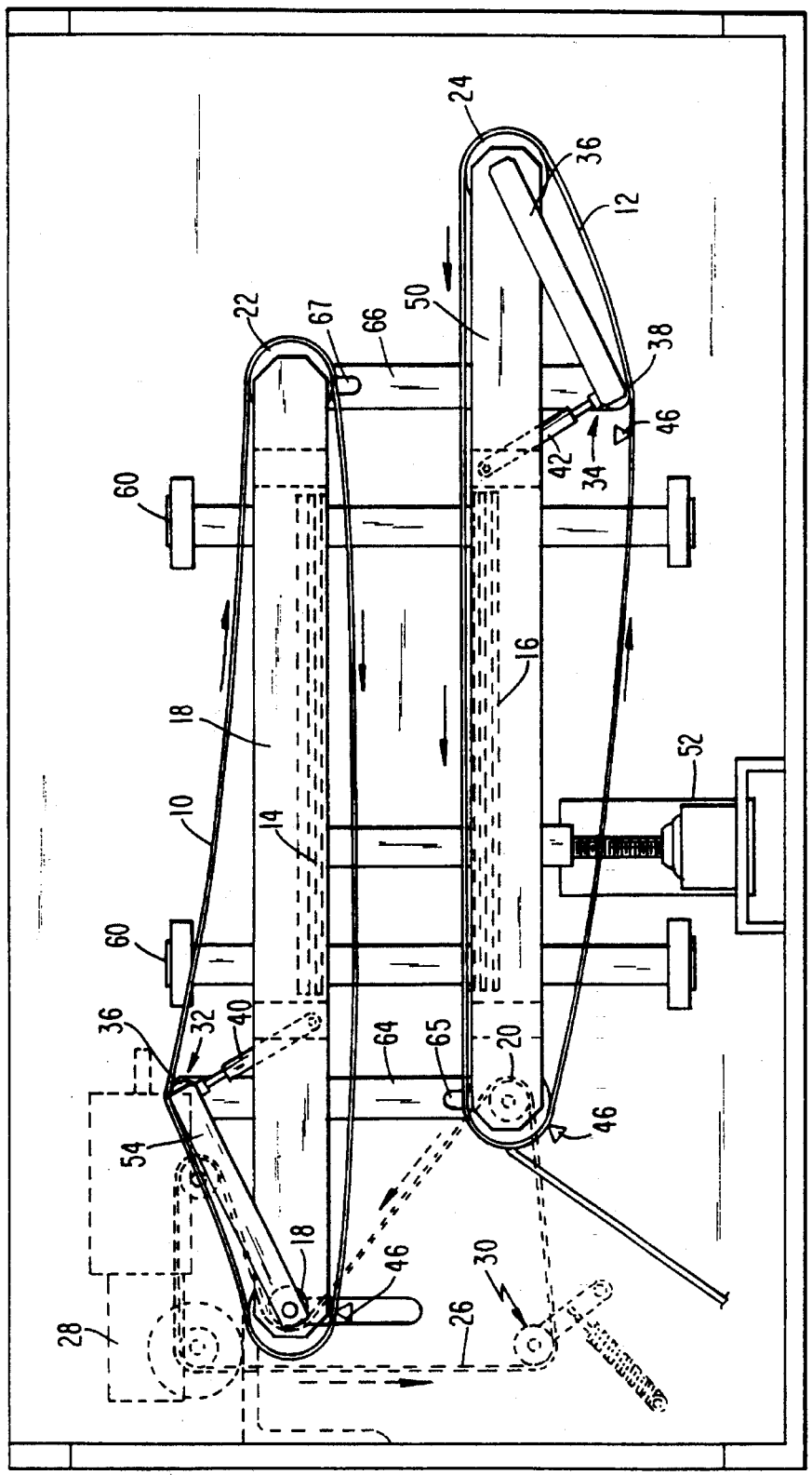
FIG. 1 is a schematic front view of an embodiment of the device of this invention with the opposed belts and platens separated.
Figure 2:
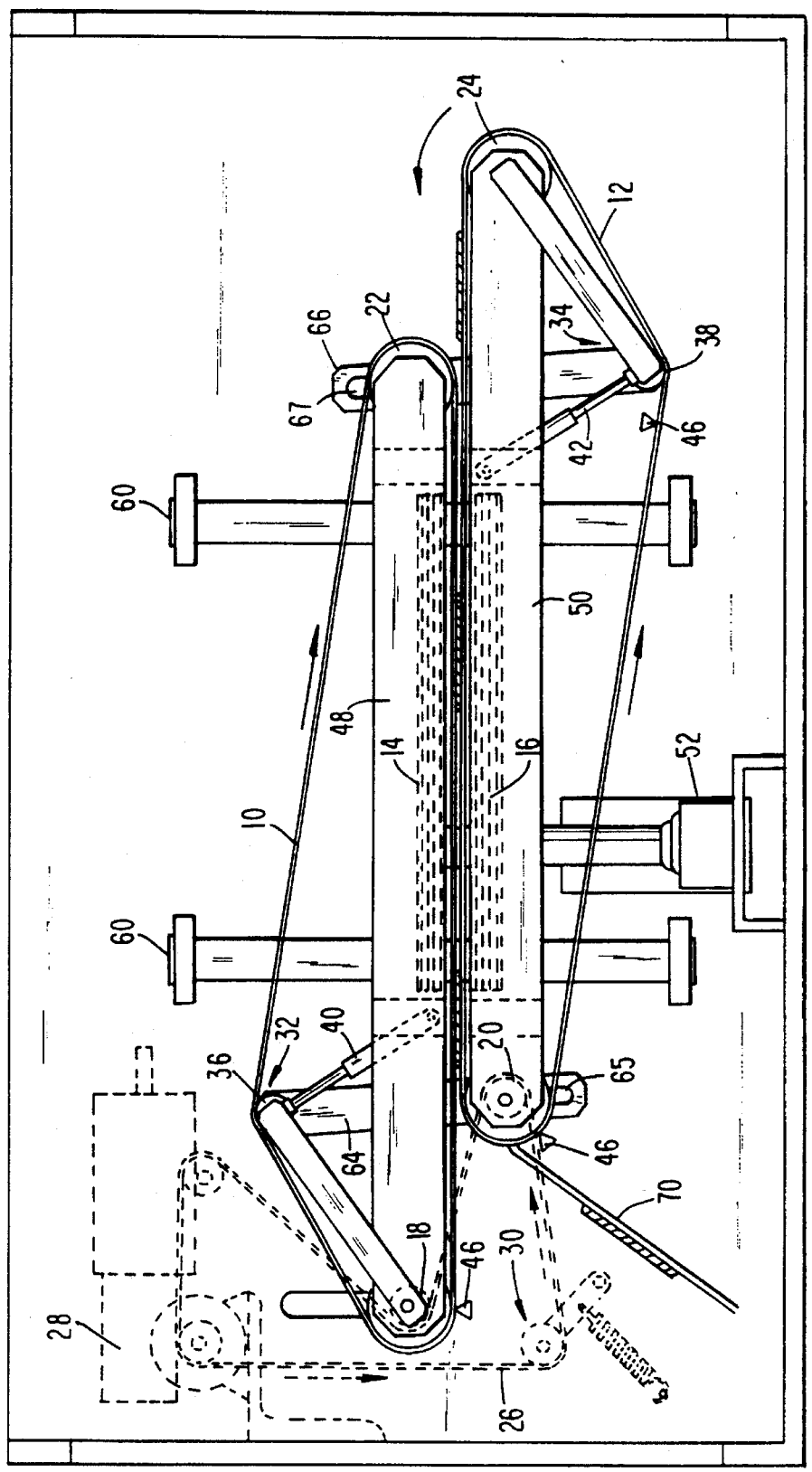
FIG. 2 is a front view of the device of FIG. 1 showing the device in a closed position for cooking.

With attention to the drawings and to FIGS. 1 and 2, in particular, the conveyor of this invention includes an upper belt 10 and a lower belt 12. The belts are preferably constructed of fiberglass covered or impregnated with Teflon. The belt conducts heat because of the thin cross section. Teflon is a good insulator. In addition, the belt is resistant to the accumulation of cooked or partially cooked food. Upper belt 10 encircles an upper heated platen 14 and lower belt 12 similarly encircles a lower heated platen 16. Platens 14 and 16 are of conventional design and may be heated, for example, electrically. As shown in FIGS. 1 and 2, the belts 10 and 12 rotate in opposite directions with food traveling from right to left as it cooks on the conveyor formed by said belts.

Rotation of belts 10 and 12 is achieved by driven rollers 18 and 20 and idler rollers 22 and 24. The drive system is a chain drive of conventional design as shown in phantom in FIGS. 1 and 2 consisting of an endless chain 26 driven by gear motor 28 to rotate the driven rollers 18 and 20. As shown in FIGS. 1 and 2, tension is maintained on chain 26 whether the upper belt 10 is in the raised position shown in FIG. 1, or in the lowered cooking position shown in FIG. 2. Tension is maintained by a biased idler assembly 30 in the conventional fashion.

Tension on belts 10 and 12 is maintained by roller assemblies 32 and 34 wherein idlers 36 and 38 maintain belts 10 and 12 in tension by air springs 40 and 42. As will be obvious to those skilled in the art, depression of air springs 40 or 42 will relieve the tension on belts 10 or 12 so that the belts may be easily slipped from the respective rollers 18 and 22 or 20 and 24. In this way, belts may be removed for cleaning or replaced rapidly.

Grease accumulation on belts 10 and 12 can be a problem, but in the device of this invention, doctor blades 46 are used to minimize the accumulation. With reference to the lower belt 12, doctor blades 46 are disposed adjacent idler 38 and driven roller 20 respectively inside and outside of the belt. In the case of upper belt 10, the doctor blade 46 is disposed adjacent the driven roller 18 on the outside thereof. The doctor blade may be a plastic straight edge or similar type of device and, preferably, is disposed at an acute angle to the path of travel of the respective belt. Obviously, the blades must be of a material resistant to heat and hot grease. The blades are secured by any conventional manner so that they may be easily removed. The blades, of course, contact the belt and the preferred angle is approximately 15° to the path of travel. The upper belt 10, rollers 18 and 22, and platen 14 are mounted within an upper frame 48. Similarly, lower belt 12, rollers 20 and 24, as well as lower platen 16, are mounted within lower frame 50. Upper frame 48 is attached to a linear actuator 52 to achieve movement between the position of FIG. 1 and 2 which is a vertical distance of approximately 3–6 inches. Linear actuator 52, as shown in FIG. 1, is a screw jack, but any conventional linear actuator would work within this invention. In addition, tensioner support arms 54 and 56 are rotatably mounted respectively to frames 48 and 50 and, in turn, support tension idlers 36 and 38 against the pressure of air springs 40 and 42 to maintain tension in belts 10 and 12. The biasing force in springs 40 and 42 is predetermined to accommodate the particular belt material. The air springs 40 and 42, as shown, are similarly pivotally attached at, respectively, frames 48 and 50.

Figure 3:
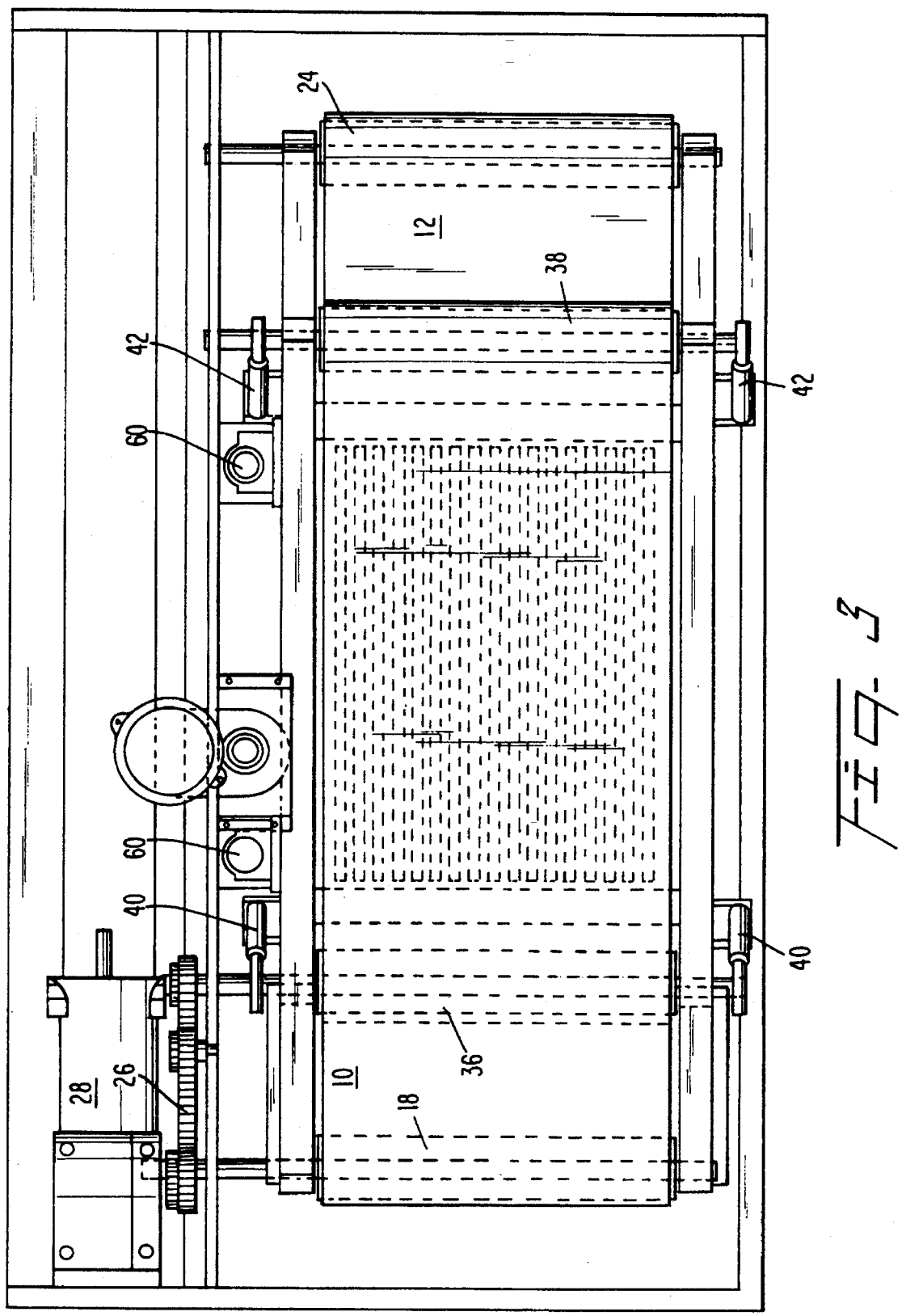
FIG. 3 is a plan view of the device of FIGS. 1 and 2.

Vertical support for frames 48 and 50 is provided by vertical support members 60 which are mutually spaced. Frame 48 is vertically movable along support members 60 from the position shown in FIG. 1 to the position shown in FIG. 2 and back while lower frame 50 is generally immovable relative thereto. When the upper frame 48 is elevated by the linear actuator 52 and positioned on supports 60, the tension arm actuators 64 and 66 function as follows:

When the actuator 52 elevates the upper frame 48 as shown in FIG. 1, the tension rollers 36 and 38 travel a prescribed distance of about 3 to 6 inches. The tension arm actuators 64 and 66, though, reach a stop point. Further movement upward of the frame 48 relative to the frame 50 by actuator 52 then compresses the air springs 40 and 42 which relieves tensions on belts 10 and 12. The belts then can be quickly removed without tools and replaced. Frames 48 and 50 extend outwardly from supports 60 in a cantilever fashion to facilitate the removal of the belts. See FIG. 3.

As shown in FIG. 2, the food to be cooked is intended to travel through the device of this invention from the right to the left whereby cooked food exits on ramp 70. The distance between platens 14 and 16, and belts 10 and 12 can be regulated by the linear actuator 52 to any desired distance. This regulation does not affect tension on the belts 10 and 12 as exerted by rollers 36 and 38 due to the slots 65 and 67 provided in tension arm actuators 64 and 66. As will be obvious to those skilled in the art, vertical movement would only affect the tension on rollers 36 and 38 when the arms are fully extended as shown in FIG. 1. The slots 65 and 67 then act as stop members described above. As will be obvious though, other conventional mechanical means may be substituted for the slots.

As indicated above, however, the setting between the platens can be strictly controlled by the linear actuator 52 between the platens 14 and 16 so that a very precise setting may occur. In this way, the device of this invention can be rapidly adjusted to cook articles having different thicknesses. Furthermore, the spacing required can be preset using a conventional controller (not shown) which will drive the actuator a predetermined number of rotations to achieve the spacing required. It must be remembered that the belts 10 and 12 are quite thin and flexible and are relatively frictionless so that they can easily traverse the distance between closely spaced heated platens 14 and 16. Doctor blades 46 are required, however, to avoid slippage of the belts due to grease thereon.

Grease from the device of this invention is intended to fall by gravity into a sump centrally located and not shown herein. The sump is disposed in a slope configuration so that grease which drips from the belts or is scraped therefrom by the doctor blades 46 will roll downwardly into a common sump so that it may be removed by conventional equipment normal to fast food operations wherein large quantities of hot fat must be transported. See, for example, U.S. Pat. Nos. Des. 292,838 and Des. 292,339 assigned to the assignee of this invention as exemplary thereof.

Figure 4:
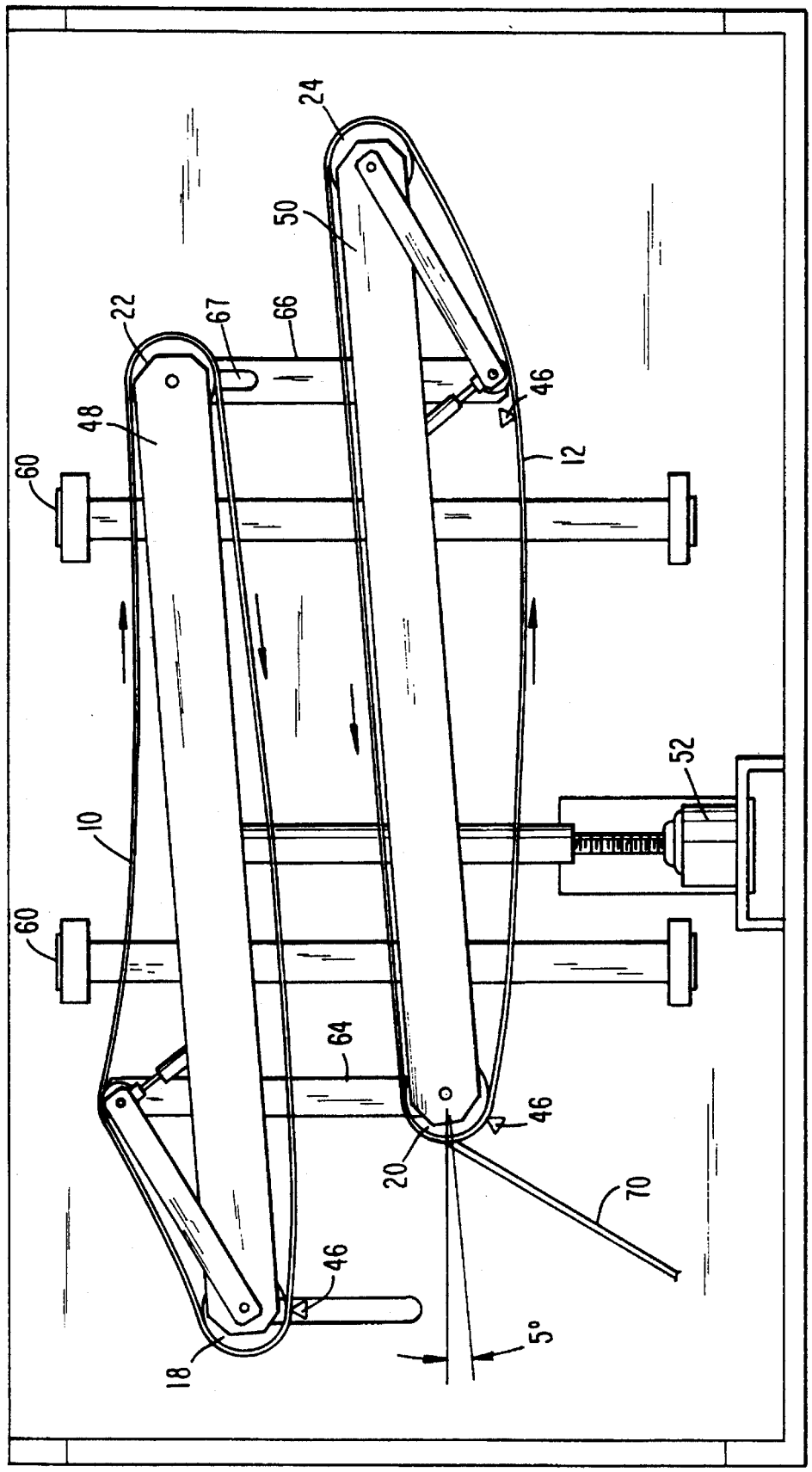
FIG. 4 is a front view similar to FIG. 1 of an alternate embodiment of the device of this invention.

In the embodiments of FIGS. 1 and 2, the frames 48 and 50 are disposed substantially horizontal. However, in the embodiment of FIG. 4, the frames 48 and 50 are disposed at an angle to the horizontal achieved relative to vertical supports 60. Preferably the angle is about 5° to the horizontal which facilitates grease removal. As it travels by gravity along the sloping surfaces of the belts 10 and 12 to drip therefrom into the sump (not shown). As will be obvious to those skilled in the art, the angle with which frames 48 and 50 are disposed relative to the horizontal does not change the fact that the frames are disposed in parallel relationship to each other. This is necessary in order to insure that the desired pressure will be applied to the food to be cooked as it passes therethrough.

Similarly, as will also be obvious to those skilled in the art, platens 14 and 16 need not be disposed in a parallel relationship to each other. For example, typically in a fast food operation, as the food is cooked, it shrinks. Therefore, if a uniform pressure is to be maintained upon the food product throughout the length of the cooking process, the platens should be closer together as the food exits than they were as the food enters. In the case of hamburgers, the shrinkage clearly is due to the grease expelled from the product to be cooked and, therefore, the product cooked can exit on ramp 70 while the grease generated by the cooking process drips from the lower belt 12 at, for example, the doctor blade 46. The sump (not shown) then would be disposed beneath the doctor blade 46 shown adjacent driven roller 20.

Figure 5:
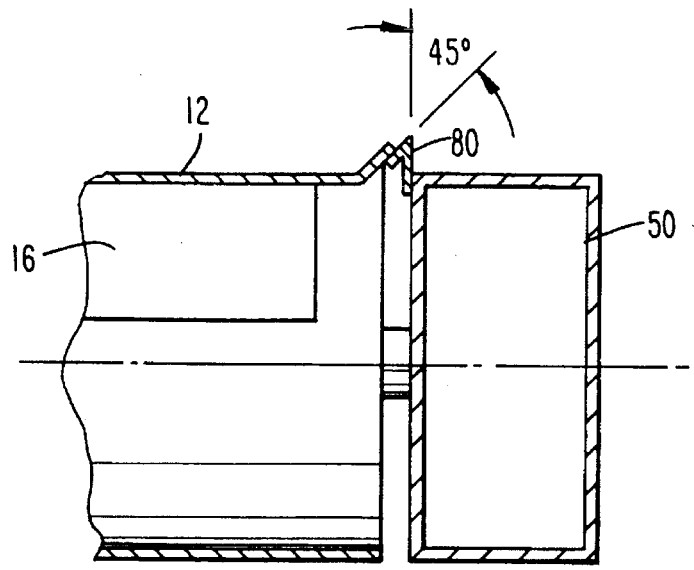
FIG. 5 is a fragmentary sectional view of the lower belt support.

With attention to FIG. 5, there is shown therein an alternate embodiment utilized to keep grease accumulated on the belt 12 until it reaches a doctor blade 46 which includes a lip member 80 mounted on the edge of frame 50. Belt 12 is sufficiently flexible so that it bends at the edge to ride along lip member 80 at an angle to the horizontal as shown in FIG. 5.

Figure 6:
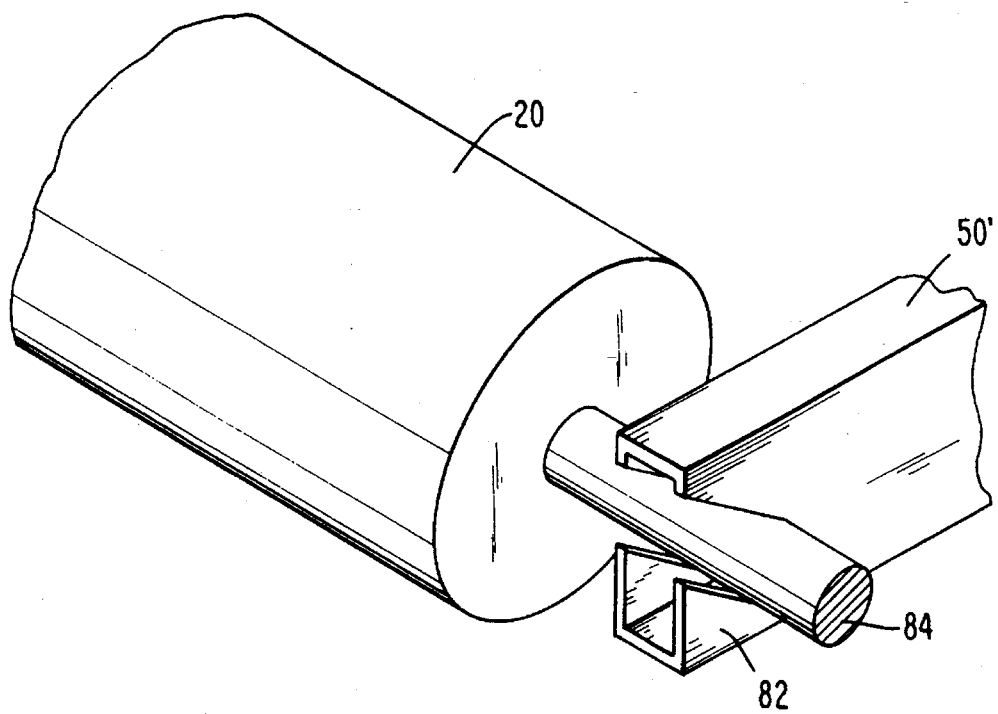
FIG. 6 is a fragmentary perspective view showing a belt support roller mount.

With reference to FIG. 6, it is desirable when the belts 10 and 12 have been removed to also remove the rollers 18, 20, 22, and 24 for washing. In the embodiment shown in FIG. 6, the roller 20 is mounted in an angled slot 82 by its axial pin 84 in frame 50'. In this way, the tension on belt 12 which passes around the roller maintains the roller in slot 82 until such tension is removed. Typically a bearing (not shown) is also provided in the slot 82. As will be obvious to those skilled in the art, this may be adapted for use with either roller 20 or 24, and in frame 48 with either rollers 18 or 22 as desired.

In the alternative, a conventional mounting wherein the pin 84 is spring loaded and the hole in the frame member 50 is a blind hole. FIGS. 1 and 2 show how such an arrangement could be provided.

In summary, there is described herein a device for adapting belt grill technology to the fast food industry wherein food products can be cooked rapidly and efficiently by placing the food products at an end wherein they are drawn into the nip between opposed belts and through upper and lower heated platens whereby the food products are cooked and then expelled at the opposite end of the conveyor. By mounting the belts on a cantilever construction, the belts can be easily removed from their respective rollers for cleaning or replacement and the upper platen and belt assembly can be moved upwardly or downwardly to adjust the distance between platens and, therefore, the nip between the belts so that the desired amount of pressure is exerted on the product during cooking.

What is claimed is:

1. A belt grill for cooking food comprising:

an upper frame assembly and a lower frame assembly disposed in registration thereon, each assembly including a heated platen and a continuous belt surrounding said platen in heat conductive relationship therewith, said platens having, respectively, lower and upper heating surfaces mutually spaced a predetermined distance apart and said belts being rotatably mounted with at least a portion of a lower run of said upper belt and an upper run of said lower belt extending between the heating surfaces of said platens, said belts being mutually spaced to form a nip between the lower portion of said upper belt and the upper portion of said lower belt adapted to receive food to be cooked;

means coupled to said belts for driving said belts simultaneously in opposite directions;

means coupled between said frames for spacing the heating surfaces of said platens a predetermined distance apart;

means coupled between each frame and belt for applying tension to said belt; and means coupled between said spacer means and said tension means for simultaneously releasing the tension on said belts.

2. The grill of claim 1 wherein each frame further comprises a plurality of rollers supporting its said belt and said drive means is coupled to one roller in each frame, driving said rollers.

3. The grill of claim 2 wherein driven rollers rotate in the same direction to drive said belts in opposite directions.

4. The grill of claim 1 wherein said tension means includes an upper idler roller and a lower idler roller engaging respectively the inner surfaces of the upper and lower belts and bias means normally urging each idler roller into engagement with a respective belt.

5. The device of claim 4 wherein the bias means includes an air spring extending between the respective frame and idler roller.

6. The grill of claim 5 wherein said spacer means includes a linear actuator coupled to said upper frame and platen for movement thereof relative to said lower frame and platen.

7. The grill of claim 6 wherein said releasing means includes means coupled between said upper idler and air spring and lower frame and said lower idler and air spring and upper frame for depressing said springs when said platens are driven to exceed a predetermined distance apart by said actuator.

8. The grill of claim 1 wherein said frames and platens are disposed in parallel planes which in turn are disposed at an acute angle to the horizontal.

9. The grill of claim 1 wherein doctor blade means is provided engaging surfaces of said belts for removing accumulated cooking products therefrom.

10. The grill of claim 1 wherein said lower frame includes lip means supporting an edge of the upper portion of said lower belt as it passes over said lower platen to retain accumulated cooking products thereon.

11. The grill of claim 1 wherein said belts are fiberglass fabric coated with Teflon.

12. The grill of claim 9 wherein said belts are of a fiberglass fabric coated with Teflon and said doctor blade means engages both the inner and outer surface of said lower belt and the outer surface of said upper belt.

* * * * *